(12) United States Patent
Park et al.

(10) Patent No.: US 6,999,660 B2
(45) Date of Patent: Feb. 14, 2006

(54) HIGHLY EFFICIENT FOCUSING WAVEGUIDE GRATING COUPLER USING LEAKY MODE

(75) Inventors: Yongwoo Park, Daejon (KR); Yeungjoon Sohn, Daejon (KR); Mun-Cheol Paek, Daejon (KR); Dong Woo Suh, Daejon (KR); Hojun Ryu, Seoul (KR); Hyeon-Bong Pyo, Daejon (KR)

(73) Assignee: Electronics and Telecommunications Research Institute, (KR)

( * ) Notice: Subject to any disclaimer, the term of this patent is extended or adjusted under 35 U.S.C. 154(b) by 172 days.

(21) Appl. No.: 10/749,349

(22) Filed: Dec. 31, 2003

(65) Prior Publication Data

US 2005/0008294 A1 Jan. 13, 2005

(30) Foreign Application Priority Data

Jul. 8, 2003 (KR) .................... 10-2003-0045987

(51) Int. Cl.
*G02B 6/34* (2006.01)

(52) U.S. Cl. .................................... 385/37
(58) Field of Classification Search ............. 385/37; 359/742; 369/112.27, 112.03–112.08
See application file for complete search history.

(56) References Cited

U.S. PATENT DOCUMENTS

| 3,982,810 | A |   | 9/1976 | Tamir et al. |
|-----------|---|---|--------|--------------|
| 4,779,259 | A |   | 10/1988 | Kono et al. |
| 4,861,128 | A | * | 8/1989 | Ishikawa et al. ............ 385/37 |
| 5,436,991 | A |   | 7/1995 | Sunagawa et al. |
| 5,657,407 | A |   | 8/1997 | Li et al. |
| 6,285,813 | B1 |   | 9/2001 | Schultz et al. |
| 6,436,613 | B1 | * | 8/2002 | Fallahi et al. ............ 430/321 |

OTHER PUBLICATIONS

Ura, et al., "An Integrated-Optic Disk Pickup Device," Journal of Lightwave Technology, vol. LT-4, No. 7, Jul. 1986, pp. 913-918.

R. Ulrich, "Efficiency of Optical-Grating Couplers," Journal of the Optical Society of America, vol. 63, No. 11, Nov. 1973, pp. 1419-1431.

(Continued)

*Primary Examiner*—Rodney Bovernick
*Assistant Examiner*—Mike Stahl
(74) *Attorney, Agent, or Firm*—Blakely Sokoloff Taylor & Zafman (57) ABSTRACT

Provided is a focusing waveguide grating coupler using a leaky mode which can form single output beam while relieving the dependency on manufacturing processes. The focusing waveguide grating coupler of the present research includes: a substrate having a first refraction index n1; a first core layer having a second refraction index n2, the first core layer being formed on the substrate; a second core layer having a third refraction index n3, the second core layer being formed on the first core layer apart from the first core layer with a space d in between; a first cladding layer having a fourth refraction index n4, the first cladding layer being formed on the second core layer; a second cladding layer having a fifth refraction index n5, the second cladding layer being formed on the first cladding layer and inserted between the first core layer and the second core layer; and a Fresnel lens positioned on the second cladding layer, wherein the refractive indexes satisfy conditions of n5>(n2, n3)>n1 and n5>n4; and light inputted through the first and second core layers to the Fresnel lens as radiated leaky beam by a leaky mode formed according to the conditions, and the leaky beam forms an optical focus by performing single directional coupling.

8 Claims, 6 Drawing Sheets

OTHER PUBLICATIONS

Aoyagi, et al., "High-Efficiency Blazed Grating Couplers," Applied Physics Letters, vol. 29, No. 5, Sep. 1, 1976, pp. 303-304.

Rancone, et al., "Single-leakage-channel grating couplers: comparison of theoretical and experimental branching ratios," Optics Letters, vol. 18, No. 22, Nov. 19, 1993, pp. 1919-1921.

Avrutsky, et al., "High-efficiency single-order waveguide grating coupler," Optics Letters, vol. 15, No. 24, Dec. 15, 1990, pp. 1446-1448.

Sheard, et al., "Focusing waveguide grating coupler using a diffractive doublet," Applied Optics, vol. 36, No. 19, Jul. 1, 1997, pp. 4349-4353.

* cited by examiner

HIGHLY EFFICIENT FOCUSING WAVEGUIDE GRATING COUPLER USING LEAKY MODE

FIELD OF THE INVENTION

The present invention relates to a focusing waveguide grating coupler and, more particularly, to a focusing waveguide grating coupler having enhanced coupling efficiency.

DESCRIPTION OF RELATED ART

Focusing waveguide grating lenses become smaller and lighter than conventional lenses such as spheric lenses, aspheric lenses and compound lenses. Since a light source and a detector can be integrated in a waveguide, the miniaturized focusing waveguide grating lenses can be applied to the areas in need of miniaturized lenses, for example, optical disk storages and parts for optical communication systems.

Conventional Fresnel lenses diffract and converge parallel light with a simple Fresnel diffraction grating. The flat Fresnel lenses substitute thick spheric lenses, and they are mostly used for display equipment such as projectors.

However, a grating lens of the present invention is more like a miniaturized focusing light source device, considering that a grating is formed on a waveguide and a guided mode becomes an input light source, while the conventional Fresnel lenses are mere substitution for spheric lenses.

An application of the grating formed on a planar waveguide to an optical pickup device is disclosed in a paper by S. Ura, T. Suhara, H. Nishihara, and J. Koyama, entitled "An Integrated-Optic Disk Pickup Device," J. Lightwave Technology, Vol. 4, pp. 913–918, 1986.

<1$^{st}$ Prior Art>

Figure 1:
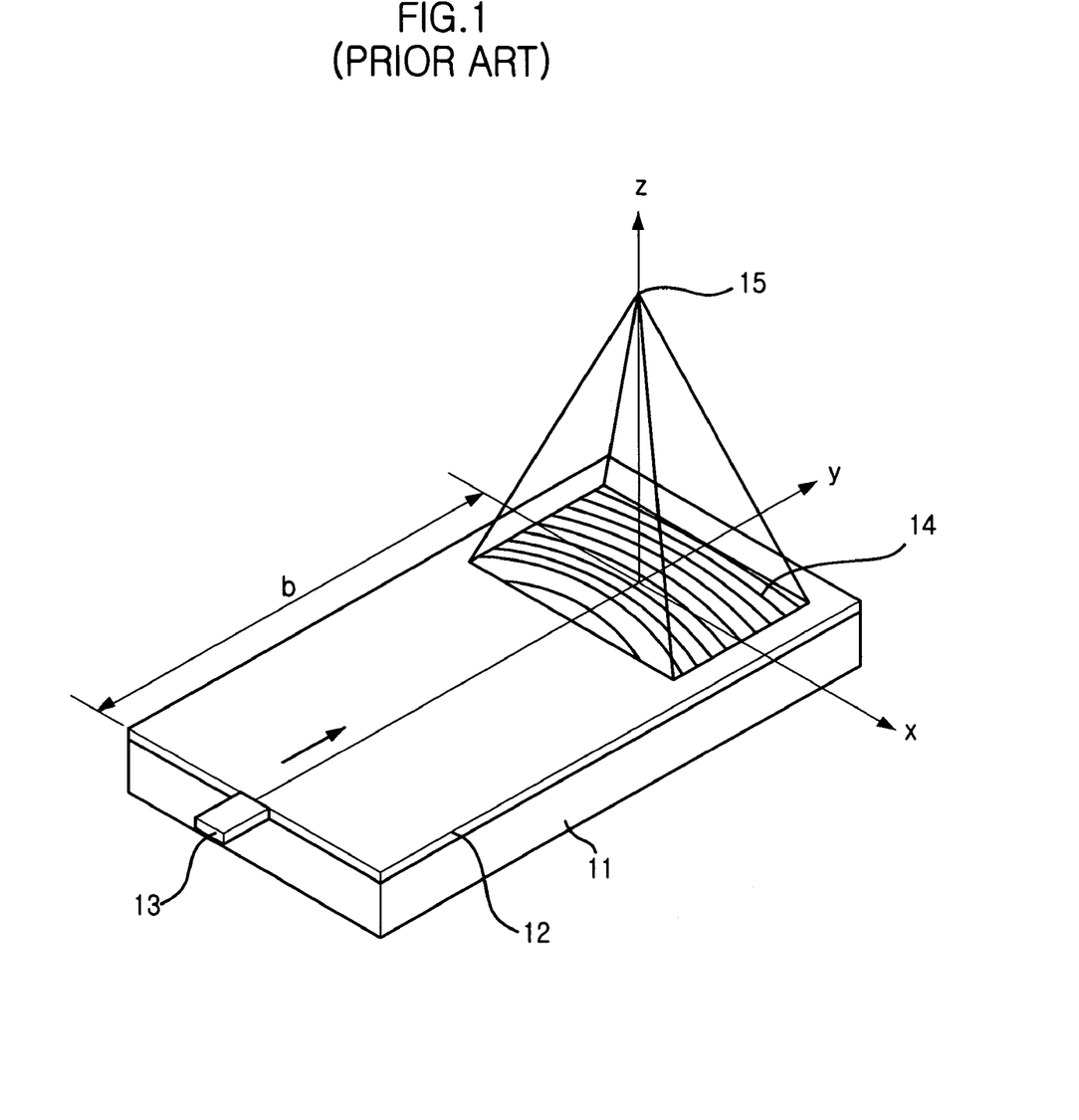
FIG. 1 is a perspective view illustrating a focusing waveguide grating coupler in accordance with a first prior art.

FIG. 1 is a perspective view illustrating a conventional focusing waveguide grating lens. Referring to FIG. 1, the focusing waveguide grating lens includes a substrate 11, a laser diode 13, a core layer 12, and a focusing grating 14.

The substrate 11 is positioned on a plane formed of an x axis and a y axis. The laser diode 13 is attached on one side of the substrate 11 and couples lights into the waveguide. The core layer 12 is placed on the substrate 11 and forms a planar waveguide. The focusing grating 14 converges the light emerging from the laser diode 13 and forms an optical focus 15 out of the waveguide on a z axis.

Although not illustrated in the drawing, a photodiode and a beam splitter may be integrated additionally to form an optical pickup head. A reference character 'b' denotes a distance between input of light, which is outputted from the laser diode 13 and inputted to a waveguide, and the center of the focusing grating 14.

The focusing waveguide grating coupler comes in the spotlight as a next-generation optical pickup head, because it can be miniaturized by integrating basic functions for detecting optical signals on the waveguide, which is different from a conventional pickup head.

However, to put the optical pickup head to practical use, problems of low optical coupling efficiency and large optical focus should be solved. The low optical coupling efficiency, which is a structural matter, should be improved necessarily.

Figure 2A:
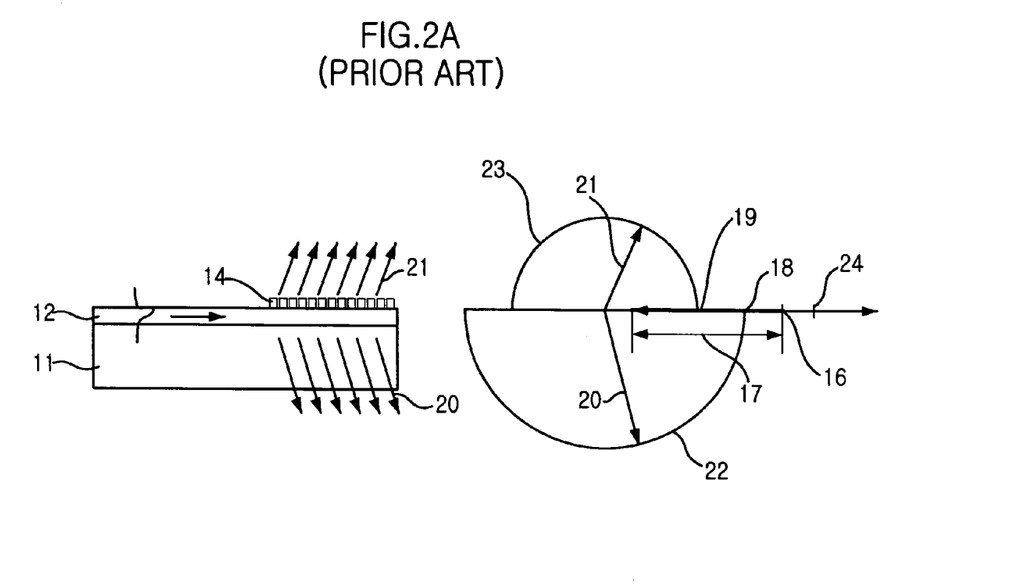
FIGS. 2A and 2B are phase matching diagrams depicting a representative coupling method in which a focusing waveguide grating coupler can produce output beams.
Figure 2B:
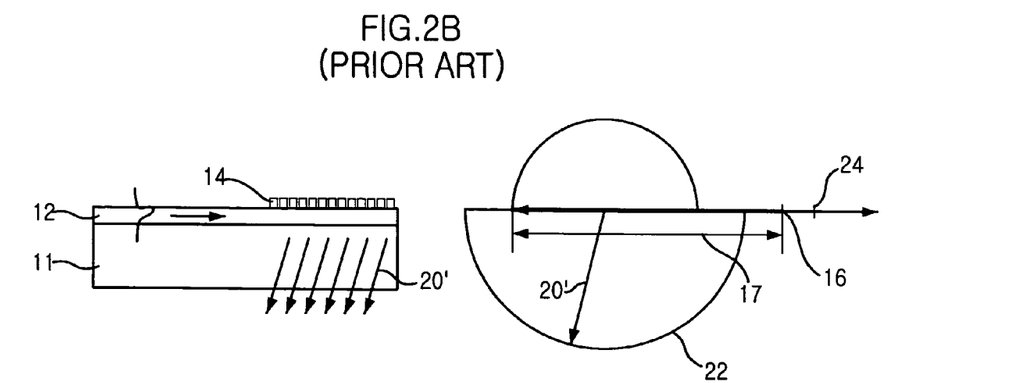

FIGS. 2A and 2B are phase matching diagrams depicting a representative coupling method in which a focusing waveguide grating coupler can radiate output beams. Referring to FIGS. 2A and 2B, a coupler includes a substrate 11 and a core layer 12. With an air layer and the substrate 11 as a boundary, a mode is formed on the core layer 12 and propagates in an arrow direction. Here, the refraction index ($n_f$) of the core layer 12 is larger than the refraction index ($n_s$) of the substrate 11. When the guided mode meets the focusing grating 14, which is a surface-relief grating, output beams 20, 20' and 21 having a smaller propagation constant than the guided mode can be obtained. Here, the focusing grating 14 is a staircase-type uneven grating.

Referring to FIG. 2A, if a grating vector 17 which is determined by a grating period fulfills a condition of '$-n_ck<Nk-K<n_ck$' with respect to a propagation constant 16 of the guided mode, a propagation constant ($n_sk$) 18 of the substrate 11, and a propagation constant ($n_ck$) 19 of the air layer, the output beams 20 and 21 are formed towards the air layer and the substrate 11. In the above condition, K denotes grating vector ($K=2\pi/\Lambda$) and $\Lambda$ denotes the period of the grating.

The reference numeral '20' indicates the output beams coupled and propagating towards the substrate 11. The reference numeral '22' denotes a propagation vector locus of the output beams coupled and propagating towards the substrate 11. The reference numeral '21' indicates the output beams coupled and propagating towards the air layer, and the reference numeral '23' denotes a propagation vector locus of the output beams coupled and propagating towards the air layer. Here, the propagation constant 24 of the core layer 12 is $n_fk$.

Referring to FIG. 2B, if the grating vector 17 fulfills a condition of '$-n_sk<Nk-K<n_ck$', the output beam 20' is formed only toward the substrate 11. This is called single-beam coupling.

Generally, the focusing waveguide grating coupler has two-way output beams 20 and 21, which is described above. Therefore, even if optical losses such as butt-coupling loss and waveguide absorption loss are minimized, it is very hard to obtain the power coupling efficiency to the air layer of over 50%. Methods for improving the low efficiency can be divided into four. Among the four, a structure applicable to a pickup head will be described herein with reference to a second prior art and a third prior art.

<2$^{nd}$ Prior Art>

Figure 3:
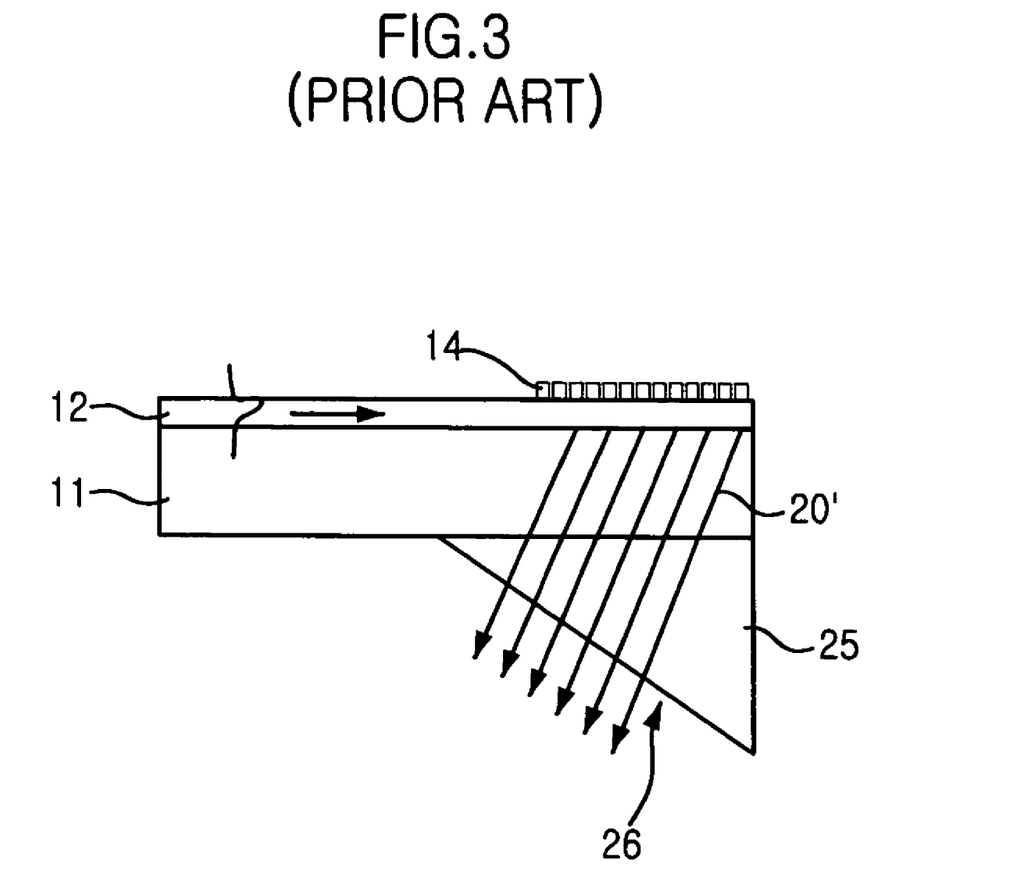
FIG. 3 is a cross-sectional view showing a focusing waveguide grating coupler that produces a single output beam by using a prism in accordance with a second prior art.

FIG. 3 is a cross-sectional view showing a focusing waveguide grating coupler that produces a single beam output by using a prism in accordance with a second prior art. Referring to FIG. 3, a waveguide includes a substrate 11 and a core layer 12, and a mode is formed on the core layer 12 with an air layer and the substrate 11 as a boundary and propagates in an arrow direction. Here, the refraction index ($n_f$) of the core layer 12 is larger than the refraction index ($n_s$) of the substrate 11. When the guided mode propagates and comes across with the staircase-type uneven focusing grating 14, the output beam 20' having a smaller propagation constant than the guided mode is obtained.

The structure of FIG. 3 utilizes the single output beam 20' radiated toward the substrate 11. To minimize the reflection of the output beam in the boundary surface under the substrate 11, a prism 25 is attached to the bottom of the substrate so that the output beam could go through the boundary surface vertically without suffering from any unwanted refractions.

This method has a shortcoming that the pickup head could not be miniaturized because the output beam 20' cannot be radiated vertically with respect to the surface of the waveguide. Also, since the grating period should fulfill the condition of '$-n_sk<Nk-K<-n_ck$' as described in FIG. 2B, the grating period should be shorter than a half of the input wavelength.

For example, when the input wavelength is 400 nm, the grating period should be about 150 nm to produce the single output beam 20'. The single output beam 20' can also be produced by forming the surface grating not in the rectangular staircase-type, which is described above, but in another shape.

<3rd Prior Art>

Figure 4A:
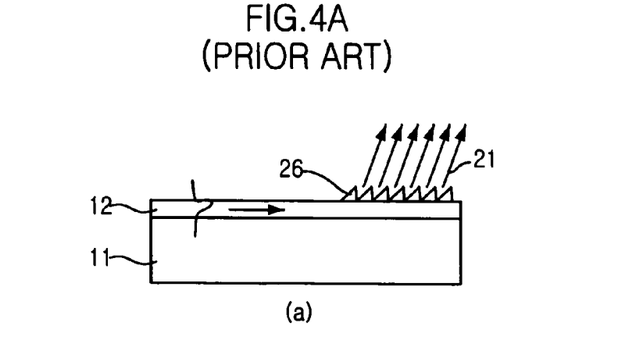
FIGS. 4A to 4C are cross-sectional views illustrating a thick holographic grating (a) that fulfill a Bragg condition and a blazed surface-relief grating (b) in accordance with a third prior art, the focusing waveguide grating coupler producing a single beam output.
Figure 4B:
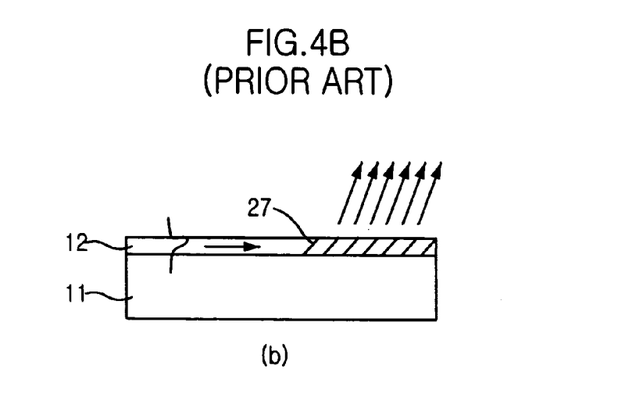
Figure 4C:
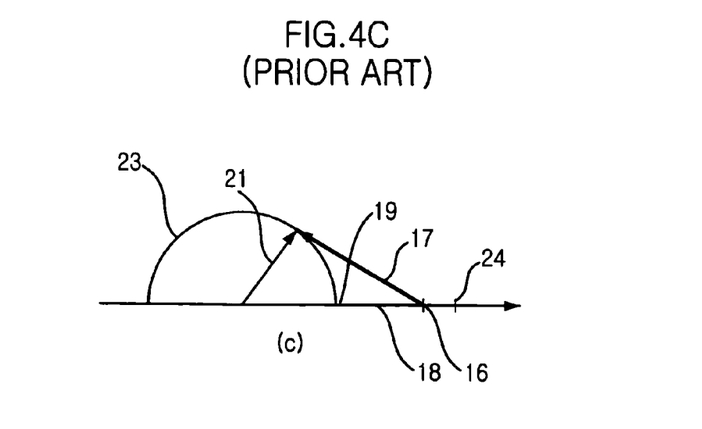

FIG. 4 is a cross-sectional view illustrating a focusing waveguide grating coupler using a thick holographic grating (a) that fulfill a Bragg condition and a focusing waveguide grating coupler using a blazed surface-relief grating (b) in accordance with a third prior art, the focusing waveguide grating coupler producing a single output beam.

Referring to FIG. 4, the waveguide includes a substrate 11 and a core layer 12. With an air layer and the substrate 11 as boundaries, a mode is formed on the core layer 12 and propagates in an arrow direction. Here, the refractive index ($n_f$) of the core layer 12 is larger than the refractive index ($n_s$) of the substrate 11. An input light can fulfill a Bragg condition, $Nk''-K''=N_c k''$, and produce output beam 21 toward the air layer in the upper part of the substrate 11, when the guided mode propagates and meets the blazed surface-relief grating 26 or a grating 27 having a structure of slant refraction index modulation.

In other words, the reference numeral 21 indicates the output beams coupled and propagating toward the air layer, while the reference numeral 23 indicates a propagation vector locus of the output beams coupled and propagating toward the air layer. Here, the propagation constant 24 of the core layer 12, the propagation constant 26 of the guided mode TE01 or TM01, the propagation constant 18 of the substrate 11, and the propagation constant 19 of the air layer are $n_f k$, $Nk$, $n_s k$ and $n_c k$, respectively.

Figure 5:
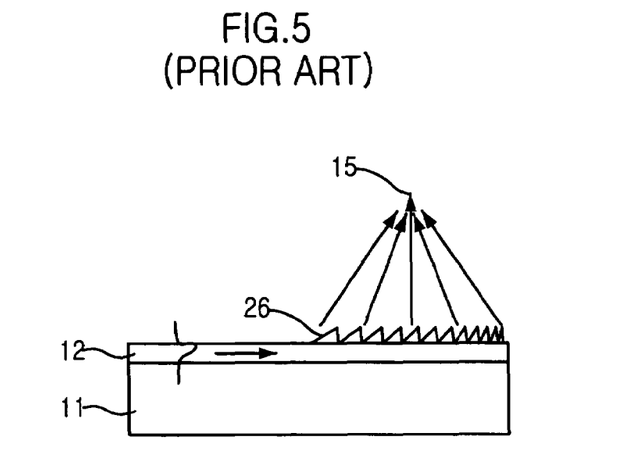
FIG. 5 is a cross-sectional view describing an optical focus in the blazed surface-relief grating of FIG. 4.

FIG. 5 is a cross-sectional view describing an optical focus in the blazed surface-relief grating of FIGS. 4A and 4B. Theoretically, the gratings illustrated in FIGS. 4A and 4B are the most desirable grating structures. However, the gratings should be fabricated to have an inclination angle changing at every location and a grating period of tens of nanometers, which is shorter than a wavelength to have the optical focus as shown in FIG. 5.

Current lithography technology has a limitation in the fabrication of the grating 26 satisfying the above conditions. Even if it is embodied successfully, it would hardly be reproducible.

Therefore, another approach is required other than the grating having a period shorter than a wavelength which is suggested in the structure of a coupler having a single output beam in accordance with the first through third prior arts.

SUMMARY OF THE INVENTION

It is, therefore, an object of the present invention to provide a focusing waveguide grating coupler radiating a single output beam out of the waveguide by using a waveguide having a single leaky-mode, instead of a grating having a short period, the grating which is required in a conventional focusing coupler having a single output beam. In accordance with the present invention, it is possible to fabricate a focusing waveguide grating coupler that has high coupling efficiency with reduced dependency on fabrication processes.

In accordance with an aspect of the present invention, there is provided a focusing waveguide grating coupler using a leaky mode, including: a substrate having a first refractive index n1; a first core layer having a second refractive index n2, the first core layer being formed on the substrate; a second core layer having a third refractive index n3, the second core layer being formed on the first core layer apart from the first core layer with a space d in between; a first cladding layer having a fourth refraction index n4, the first cladding layer being formed on the second core layer; a second cladding layer having a fifth refraction index n5, the second cladding layer being formed on the first cladding layer and inserted between the first core layer and the second core layer; and a Fresnel lens positioned on the second cladding layer, wherein the refractive indexes satisfies conditions of n5>(n2, n3)>n1 and n5>n4; and light inputted through the first and second core layers to the Fresnel lens as radiated leaky beams by a leaky mode formed according to the conditions, and the leaky beams form an optical focus by performing single directional coupling towards the lower part of the substrate by using beams refracted from the Fresnel lens.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 6:
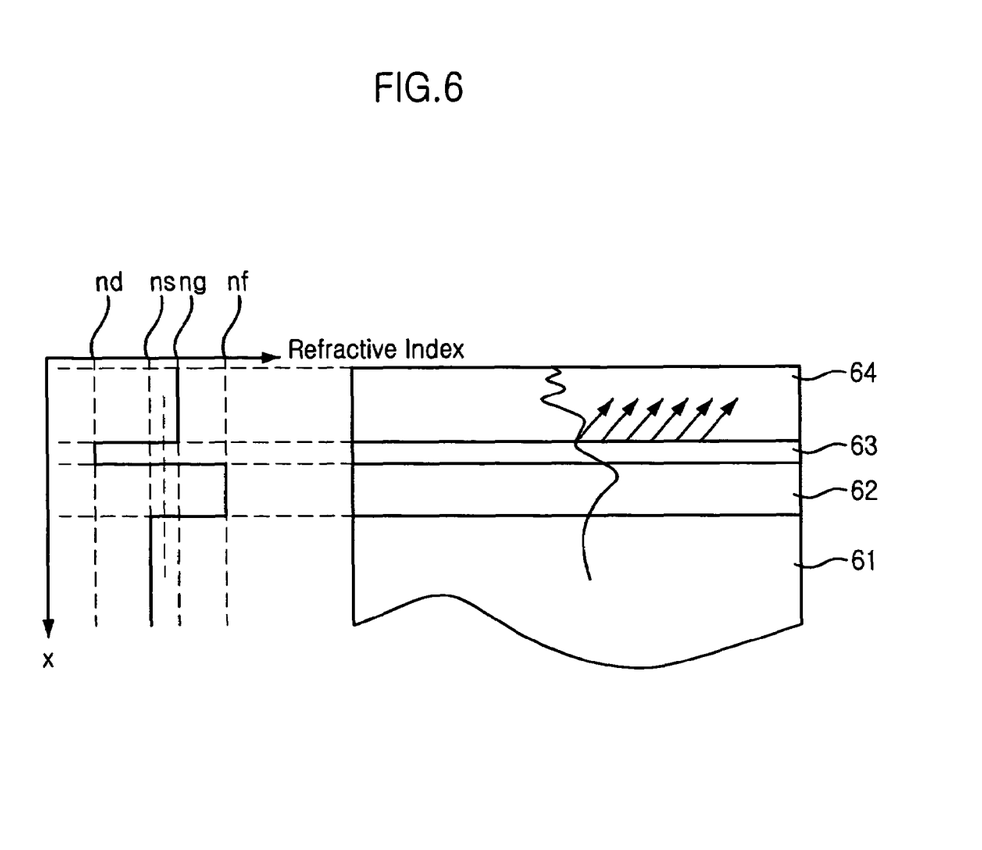
FIG. 6 is a schematic diagram showing a leaky mode in a leaky mode waveguide in accordance with the present invention.

FIG. 6 is a schematic diagram showing a leaky mode in a leaky mode waveguide in accordance with the present invention. It shows an example of a waveguide where the leaky mode can be formed.

Referring to FIG. 6, a depressed inner cladding, or inner cladding, 63 is added to a conventional asymmetrical planar waveguide. Specifically, a core layer 62 having a refraction index of $n_f$ is placed on a substrate 61 having a refraction index of $n_c$. In the upper part of the core layer 62, the inner cladding layer 63 having a refraction index of $n_d$ is formed. In the upper part of the inner cladding layer 63, a top cladding layer 64 having a refraction index of $n_g$ is formed.

The inner cladding layer 63 helps to form a single leaky mode easily by lowering the effective refraction index $n_d$ than the refraction index of $n_g$ of the top cladding layer 64. Here, lowering the refraction index of the inner cladding layer 63 for generating the leakage effect can be considered equivalently to varying macro bending loss by the extent of bending of the optical fiber.

A guided mode is determined based on the refraction index structure of the planar waveguide. Therefore, the mode power propagating toward the cladding layer to the cover cladding layer 64 and its propagation angle are determined based on a designed refractive structure of the waveguide, and the properties of the leaky mode, such as a propagation constant and leakage efficiency, may be varied according to the designed structure of the waveguide. The left part of FIG. 6 shows the relative level of the effective refraction index in the leaky mode.

The leaky mode is generated when the effective refraction index $N_d$ of the inner cladding layer 63 is smaller than the refractive index $n_g$ of the top cladding layer 64 or the refractive index $n_s$ of the substrate 61, which is disclosed by D. Marcuse, entitled "Theory of Dielectric Optical Waveguides," Academic Press, Chapter 1, pp. 31–59, 1991.

Since a bound mode is restricted by boundary conditions of the intermediate cladding layer between the two cores 62a and 62b and the under cladding layer 61, it has no loss by the radiation toward the top cladding layer 64. However, since the leaky mode has an open boundary condition at the interface between inner cladding layer 63 and the top cladding layer 64, it lose its power continuously as propagating along the waveguide.

The focusing waveguide grating coupler using the leaky mode will be described herein with reference to an embodiment of the present invention.

Figure 7:
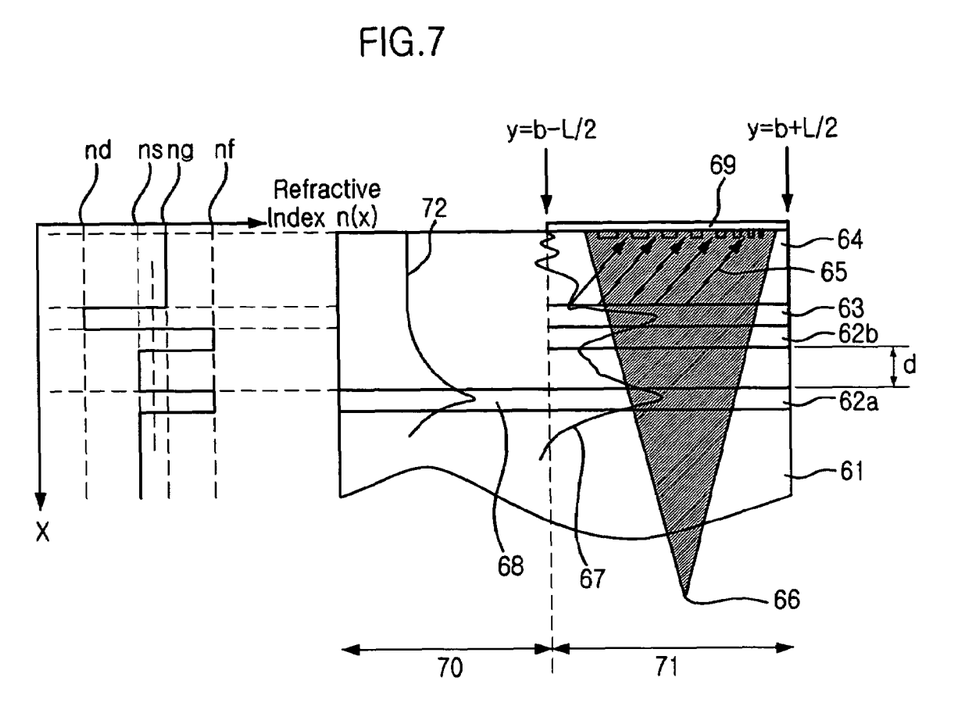
FIG. 7 shows a cross-sectional view of a focusing waveguide grating coupler, which includes a symmetrical single mode waveguide, a leaky-mode waveguide, a directional coupler, and a reflective Fresnel lens, and a diagram presenting a structure of a waveguide refraction index.

FIG. 7 shows a cross-sectional view of a waveguide focusing grating, which includes a symmetrical single mode waveguide 70, a synchronous directional coupler 71 coupling the symmetrical single mode waveguide 70 and the leaky-mode waveguide, and a reflective Fresnel lens 69. FIG. 7 also shows a diagram presenting the refractive index structure of the directional coupler.

Referring to FIG. 7, the synchronous directional coupler 71 includes a substrate having a refractive index of $n_s$; a first core layer 62a having a refractive index of $n_f$; a second core layer 62b having a refractive index of $n_f$; an inner cladding layer 63 having a refractive index of $n_d$; a top cladding layer 64 having a refractive index of $n_g$; and a Fresnel lens 69.

The first core layer 62a is formed on the substrate. The second core layer 62b is formed on the first core layer 62a with a predetermined space (d) apart from the first core layer 62a. The inner cladding layer 63 is formed on the second core layer 62b, and the top cladding layer 64 is formed on the inner cladding layer 63. The Fresnel lens 69 is placed on the top cladding layer 64. The symmetrical single mode waveguide 70 is formed of one core layer 68.

Referring to FIGS. 6 and 7, the refractions of the layers are $n_f > n_g > n_s > n_d$. Light inputted through the first and second core layers 62a and 62b goes into the Fresnel lens 69 as a radiated leaky beam 65 due to the leaky mode formed under the condition of $n_f > n_g > n_s > n_d$. The radiated leaky beam 65 forms a single directional coupling toward the lower part of the substrate 61 by the beam reflected from the Fresnel grating, thus forming an optical focus 66. Here, the first core layer 62a and the second core layer 62b may have the same or different refraction index.

Meanwhile, in the above examples, the refraction index $n_d$ of the inner cladding layer 63 has the least value among the refraction indexes. However, the leaky mode can be formed even when $n_d$ is larger than $n_f$ ($n_d > n_f$).

Therefore, if the refraction indexes of the layers fulfill the conditions of $n_g > n_f > n_s$ and $n_g > n_d$, the leaky mode can be formed.

Between the first core layer 62a and the second core layer 62b of the synchronous directional coupler 71, the top cladding 64 is extended and inserted. The length of coupling is adjusted by controlling a space (d). The amount of radiated leaky beam 65 and the leakage angle are adjusted by controlling the refraction index $n_d$ of the depressed inner cladding 63 and the refraction index $n_g$ of the top cladding 64. The leakage angle against a waveguide axis which is perpendicular to the x axis can be estimated approximately from $\cos^{-1}(N/n_g)$, wherein N denotes an effective refraction index of the leaky mode.

Here, the synchronous directional coupler 71 is located on a plane which is formed of the x and y axes. The optical focus 66 moves along the z axis. The space (d) is controlled to have the radiated leaky beam of the maximum leakage effect and Gaussian distribution within the range of $b-L/2 < y < b+L/2$, wherein b denotes a distance from input light to the center of the Fresnel lens and L denotes a diameter of the Fresnel lens.

Referring to FIG. 7, which shows an example of a waveguide grating coupler using leaky mode coupling, light is inputted from the left of the waveguide through optical fiber (or laser diode). A single mode is formed on a symmetrical planar waveguide 30 having a structure where the refraction index $n_g$ of the top cladding layer 64 and the size of the core layer 68 are the same as those of the core layer 68 of the optical fiber.

Since the shape of the planar waveguide single mode, which is the first one of the transverse electric modes, (TE0) is the same as that of a one-dimensional single mode, which is the fundamental hybrid electric mode (HE11) of the optical fiber, insertion loss can be minimized due to mode-matching effect. A reference numeral '67' denotes intensity distribution of the leaky mode in the direction of a cross section, and a reference numeral '72' denotes intensity distribution of the guided mode in the direction of a cross section.

The single mode of the planar waveguide propagates from left to right along the symmetrical waveguide, and it is inputted to the synchronous directional coupler 71 at the y-axial starting point (y=b−L/2) of the Fresnel lens. The synchronous directional coupler 71 has a structure where the symmetrical single mode waveguide 70 is formed closely to a leaky mode waveguide, which includes the core layers 62a and 62b, the inner cladding layer 63 and the top cladding layer 64.

Coupling efficiency, which indicates the level of power transmission from the planar waveguide mode to the leaky mode, is different according to the space (d) between the two waveguides. Therefore, it is desirable to transmit power to the leaky mode sufficiently by controlling the space (d) while planar waveguide mode is propagating so that the power of the planar waveguide mode could be gone away at the end of the waveguide (y=b+L/2).

The power of the leaky mode, which is transmitted from the planar waveguide mode, propagates and generates radiated leaky beam 65 having a predetermined angle continuously. The radiated leaky beam 65 is diffracted by a reflective Fresnel lens 69 to thereby form the optical focus 66.

In the conventional waveguide grating coupler of FIG. 2, coupling is formed in the upper and/or lower directions due to evanescent field of the bound electric mode. However, in the present invention, the radiated beams are propagated in a single direction toward a focus out of the waveguide due to diffraction because the beam propagation toward the top cladding layer 64 is the propagation of electromagnetic waves. Therefore, in the focusing waveguide grating coupler of the present invention, a focus is formed by forming single directional coupling, instead of bi-directional coupling.

Figure 8:
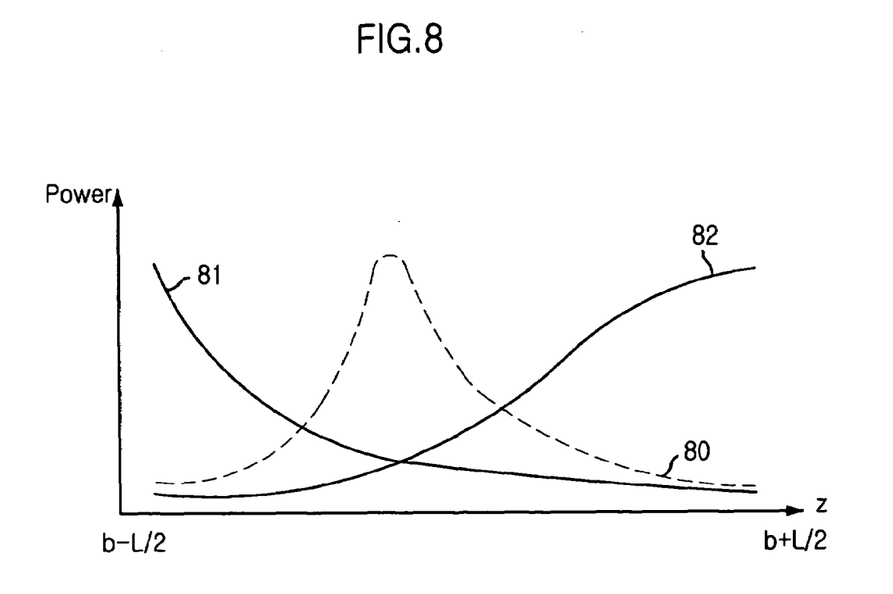
FIG. 8 is a graph illustrating a power transmission property of the leaky mode shown in FIG. 7.

FIG. 8 is a graph illustrating a power transmission property of the leaky mode shown in FIG. 7. Structures using the synchronous directional coupler 71 have following advantages: The input waveguide can be designed optimally, and the inputted power can be transmitted in the form of the leaky mode due to synchronous directional coupling effect.

Referring to FIG. 8, distribution of input beams radiated to the reflective Fresnel lens is formed in the shape 80 of Gaussian function. Generally, optical loss of the leaky mode tends to decay exponentially in a longitudinal direction. On the contrary, since the synchronous directional coupling is accumulated and increases along the longitudinal direction, the power distribution of the inputted beams of the reflective Fresnel lens, which is multiplication of sine function of the synchronous coupling and the exponential decaying function of the radiation decay is formed in the shape 80 of Gaussian function.

The distribution can reduce distortion of a focus point generated by asymmetrical distribution of input light and it is suitable for coupling a signal reflected by a recording medium at the focus point into the waveguide mode. A reference numeral '81' indicates a leaky mode intensity curve that is declined as it proceeds, and a reference numeral '82' indicates power of the leaky mode which is accumulated as it proceeds. The reference numeral '80' indicates distribution of leaky beams radiated toward the reflective Fresnel lens.

The present invention suggests a method that maximizes output coupling efficiency of input light. The output generation efficiency can be improved when the insertion loss, which is generated during the input of the light to a head, is minimized and the transmission of power to the output beams which is propagated from the waveguide mode to the outside is maximized.

The coupling efficiency of the input beams is maximized when the power distribution of the output beams is matched with the power distribution of the reflective beams. Therefore, the coupling efficiency of the input beams is improved as the power distribution of the output beams is more symmetrical.

In the embodiment of the present invention which is described above, the synchronous directional coupler, a hybrid of the symmetrical single mode planar waveguide and the leaky mode waveguide, is used to improve the output coupling efficiency. The symmetrical planar waveguide has a structure that can minimize the insertion loss.

The synchronous directional coupler transmits the entire power of the input single mode to the leaky mode, and the entire power of the leaky mode is transmitted to the Fresnel lens. Therefore, the output coupling efficiency is determined based on the diffraction efficiency of the Fresnel lens. Generally, Fresnel lenses of a two-level structure have a diffraction efficiency of 35% and those of a four-level structure have a diffraction efficiency of 60%. This is all higher than the diffraction efficiency of conventional grating coupler.

Since the y-directional power distribution of the input beams transmitted from the leaky mode to the Fresnel lens is symmetrical, the input coupling efficiency is increased relatively.

The conventional waveguide grating couplers largely depend on the progress of lithography technology. However, the synchronous directional coupler of the present invention can relieve the dependency on the manufacturing process considerably, because the characteristics of the output beams are determined based on the design of the multi-layer waveguide and the Fresnel lens. Therefore, high-efficiency waveguide grating coupler can be embodied without high-resolution lithography.

The focusing waveguide grating coupler fabricated in accordance with the technology of the present invention has high coupling efficiency with a relatively simple process and, ultimately, the performance and productivity of the focusing waveguide grating coupler can be improved.

While the present invention has been described with respect to certain preferred embodiments, it will be apparent to those skilled in the art that various changes and modifications may be made without departing from the scope of the invention as defined in the following claims.

What is claimed is:

1. A focusing waveguide grating coupler using a leaky mode, comprising:
    a substrate having a first refractive index n1;
    a first core layer having a second refractive index n2, the first core layer being formed on the substrate;
    a second core layer having a third refractive index n3, the second core layer being formed on the first core layer apart from the first core layer with a space d in between;
    a first cladding layer having a fourth refractive index n4, the first cladding layer being formed on the second core layer;
    a second cladding layer having a fifth refractive index n5, the second cladding layer being formed on the first cladding layer and inserted between the first core layer and the second core layer; and
    a Fresnel lens positioned on the second cladding layer,
    wherein the refractive indexes satisfy conditions of n5> (n2, n3)>n1 and n5>n4;
    and light inputted through the first and second core layers propagates to the Fresnel lens as radiated leaky beams by a leaky mode formed according to the conditions, and the leaky beams form an optical focus by performing single directional coupling towards the lower part of the substrate by using beams reflected from the Fresnel lens.

2. The focusing waveguide grating coupler as recited in claim 1, wherein the length of the coupling is adjusted by controlling the space d.

3. The focusing waveguide grating coupler as recited in claim 1, wherein the amount of leak beams and a leaky angle are adjusted by controlling the refractive index n4 of the first cladding layer and the refractive index n5 of the second cladding layer.

4. The focusing waveguide grating coupler as recited in claim 1, wherein the focusing waveguide grating coupler is positioned on a plane formed of an x axis and a y axis and the optical focus is matched with a z axis.

5. The focusing waveguide grating coupler as recited in claim 4, wherein the space d are controlled to have the maximum leakage effect and leaky beams of Gaussian distribution in a range of {b−L/2<y<b+L/2}, b denoting a distance between the input light and the center of the Fresnel lens and L denoting a diameter of the Fresnel lens.

6. The focusing waveguide grating coupler as recited in claim 1, wherein the second refraction index n2 and the third refraction index n3 are the same substantially.

7. The focusing waveguide grating coupler as recited in claim 1, wherein the fourth refraction index n4 is smaller than the first refraction index n1 (n1>n4).

8. The focusing waveguide grating coupler as recited in claim 1, wherein the fourth refraction index n4 is larger than the second refraction index n2 and the third refraction index n3 (n4>n2 and n4>n3).

* * * * *